US008667148B1

(12) United States Patent
Turner (10) Patent No.: US 8,667,148 B1
(45) Date of Patent: Mar. 4, 2014

(54) MINIMAL EFFORT NETWORK SUBSCRIBER REGISTRATION

(75) Inventor: R. Brough Turner, Newton, MA (US)

(73) Assignee: Netblazr Inc., Boston, MA (US)

( * ) Notice: Subject to any disclaimer, the term of this patent is extended or adjusted under 35 U.S.C. 154(b) by 75 days.

(21) Appl. No.: 13/252,715

(22) Filed: Oct. 4, 2011

Related U.S. Application Data

(60) Provisional application No. 61/404,449, filed on Oct. 4, 2010.

(51) Int. Cl.
*G06F 15/16* (2006.01)

(52) U.S. Cl.
USPC .......................................................... 709/228

(58) Field of Classification Search
USPC .................................. 370/254; 709/227, 228
See application file for complete search history.

(56) References Cited

U.S. PATENT DOCUMENTS

| | | | | |
|---|---|---|---|---|
| 7,089,313 | B2 * | 8/2006 | Lee et al. ....................... | 709/227 |
| 7,184,435 | B2 * | 2/2007 | Hsiao ............................ | 370/389 |
| 7,263,076 | B1 * | 8/2007 | Leibovitz et al. .............. | 370/310 |
| 7,333,464 | B2 * | 2/2008 | Yang et al. ..................... | 370/338 |
| 7,382,756 | B2 * | 6/2008 | Barber et al. .................. | 370/338 |
| 7,412,542 | B1 * | 8/2008 | Newson et al. ................ | 709/249 |
| 7,567,805 | B2 * | 7/2009 | Cox et al. .................... | 455/435.1 |
| 7,594,021 | B2 * | 9/2009 | Ihori et al. ..................... | 709/228 |
| 7,613,142 | B2 * | 11/2009 | Molteni et al. ................ | 370/328 |
| 7,617,317 | B2 * | 11/2009 | Jones et al. .................... | 709/227 |
| 7,653,379 | B1 * | 1/2010 | Meenan et al. ................ | 455/410 |
| 7,657,637 | B2 * | 2/2010 | Nakase .......................... | 709/228 |
| 7,685,295 | B2 * | 3/2010 | Myers et al. .................. | 709/228 |
| 7,697,932 | B2 * | 4/2010 | Nakajima ................... | 455/435.1 |
| 7,769,837 | B2 * | 8/2010 | Nogawa et al. ............... | 709/222 |
| 7,860,978 | B2 * | 12/2010 | Oba et al. ...................... | 709/227 |
| 7,912,465 | B2 * | 3/2011 | Abdel-Kader et al. ....... | 455/434 |
| 7,925,765 | B2 * | 4/2011 | Chandra et al. ............... | 709/228 |
| 7,958,211 | B2 * | 6/2011 | Lam et al. ..................... | 709/222 |
| 7,986,940 | B2 * | 7/2011 | Lee et al. ...................... | 455/411 |
| 8,019,082 | B1 * | 9/2011 | Wiedmann et al. ........... | 380/270 |
| 8,019,879 | B2 * | 9/2011 | Williams et al. .............. | 709/228 |
| 8,060,620 | B2 * | 11/2011 | Lu et al. ........................ | 709/227 |

(Continued)

OTHER PUBLICATIONS

Microsoft. (Feb. 16, 2007). How to change the binding order of network adapters in Windows XP and in Windows 2000. 8 pp. Retrieved from http://support.microsoft.com/kb/894564.*

(Continued)

*Primary Examiner* — Aaron Strange
*Assistant Examiner* — Timothy Sowa
(74) *Attorney, Agent, or Firm* — Chapin IP Law, LLC (57) ABSTRACT

An alternate access mechanism provides reduced cost Internet access using a streamlined sign-on procedure. The alternate access mechanism employs a specialized access medium including an array of nodes interconnected back to a trunk line access point. The trunk line access point allows greatly reduced cost because of competitive access to the Internet backbone. The interconnected nodes include readily available components, such as wireless routers, microwave radios, and routers, and/or integrated versions thereof which leverage close proximity to adjacent nodes for establishing a path back to the trunk line access point. Subscriber access is facilitated by a "one click" or "minimal click" sign on sequence by startup logic encoded in the components and through a web service for identifying the nearest adjacent node, establishing communication with the adjacent node via an access token such as an SSID, automatically reconfiguring the subscriber's newly connected node and reestablishing a traffic connection, all following user assent to the sign-on conditions.

23 Claims, 9 Drawing Sheets

(56) References Cited

U.S. PATENT DOCUMENTS

| | | | | |
|---|---|---|---|---|
| 8,095,664 B2* | 1/2012 | Yamaguchi et al. | | 709/227 |
| 8,103,003 B2* | 1/2012 | Hiroki | | 380/270 |
| 8,131,859 B2* | 3/2012 | Fujii et al. | | 709/228 |
| 8,150,980 B2* | 4/2012 | Sakai | | 709/228 |
| 8,161,170 B2* | 4/2012 | Nakamura | | 709/228 |
| 8,238,238 B2* | 8/2012 | Baron et al. | | 370/230 |
| 8,259,650 B2* | 9/2012 | Homma | | 370/328 |
| 8,352,616 B2* | 1/2013 | Austin et al. | | 709/227 |
| 8,526,352 B2* | 9/2013 | Murphy et al. | | 370/312 |
| 2003/0115339 A1* | 6/2003 | Hodoshima | | 709/228 |
| 2003/0212802 A1* | 11/2003 | Rector et al. | | 709/228 |
| 2004/0054774 A1* | 3/2004 | Barber et al. | | 709/224 |
| 2004/0133689 A1* | 7/2004 | Vasisht | | 709/228 |
| 2005/0073979 A1* | 4/2005 | Barber et al. | | 370/338 |
| 2007/0094356 A1* | 4/2007 | Sethi et al. | | 709/219 |
| 2008/0019367 A1* | 1/2008 | Ito et al. | | 370/392 |
| 2009/0327713 A1* | 12/2009 | Marin et al. | | 713/168 |
| 2010/0106966 A1* | 4/2010 | Santos et al. | | 713/156 |
| 2010/0115108 A1* | 5/2010 | Wang et al. | | 709/228 |
| 2010/0146129 A1* | 6/2010 | Nakahara | | 709/228 |
| 2010/0214955 A1* | 8/2010 | Rune et al. | | 370/254 |
| 2010/0246416 A1* | 9/2010 | Sinha et al. | | 370/250 |
| 2010/0263022 A1* | 10/2010 | Wynn et al. | | 726/3 |
| 2010/0296441 A1* | 11/2010 | Barkan | | 370/328 |
| 2010/0312895 A1* | 12/2010 | Fujii | | 709/226 |
| 2011/0029680 A1* | 2/2011 | Goto | | 709/228 |
| 2011/0055409 A1* | 3/2011 | Tsai | | 709/228 |
| 2011/0145421 A1* | 6/2011 | Yao et al. | | 709/228 |
| 2011/0252152 A1* | 10/2011 | Sherry et al. | | 709/228 |
| 2011/0264772 A1* | 10/2011 | Krapf et al. | | 709/220 |
| 2011/0289229 A1* | 11/2011 | Subramaniam | | 709/228 |
| 2011/0299463 A1* | 12/2011 | Bachmann et al. | | 370/328 |
| 2012/0054338 A1* | 3/2012 | Ando | | 709/224 |
| 2012/0079123 A1* | 3/2012 | Brown et al. | | 709/228 |

OTHER PUBLICATIONS

IBM. (Oct. 18, 2007). Ultra Secure Wireless Network Setup Solution. IP.com Prior Art Database Technical Disclosure Bulletin. 6 pp. Retrieved from http://ip.com/IPCOM/000159369.*

* cited by examiner

MINIMAL EFFORT NETWORK SUBSCRIBER REGISTRATION

RELATED APPLICATIONS

This application claims the benefit of U.S. Provisional Patent Application No. 61/404,449, filed Oct. 4, 2010, entitled "ONE-CLICK WIRELESS COMMUNITY ENROLLMENT", incorporated herein by reference in entirety.

BACKGROUND

In a networked computing environment, users receive network transport services from an Internet services provider (ISP) for accessing the Internet and other public and private networks. ISPs maintain high speed trunk lines for providing Internet service to many users, or subscribers. A subscriber is a customer such as an individual or a business or similar enterprise having one or more user devices requiring Internet connection. The ISPs, therefore, operate on a fee-for-services basis, typically based on the bandwidth of the subscriber connection. A subscriber or business, therefore, typically requires additional bandwidth as the number of user devices increases. Accordingly, Internet costs for a large business or other enterprise can be substantial. Most ISPs offer service level agreements (SLAs), which purport to guarantee specific performance or uptime guarantees.

SUMMARY

Despite SLAs, most subscribers expect occasional outages. For critical facilities, many IT managers will employ a second ISP and use load sharing or failover to improve reliability. In addition, subscribers to an ISP often seek to optimize value by reducing cost for additional bandwidth. An alternate access mechanism provides improved availability at lower cost, avoiding absolute loss of service in the event of failure of the primary ISP, an occurrence which can be costly in an enterprise that relies on Internet connectivity. The alternate access mechanism employs a specialized access medium including an array of nodes interconnected back to a trunk line access point. Trunk line access point are selected so as to minimize the cost of connecting to the Internet backbone, for example by being located in a backbone data center or in a building which has owned or low-cost competitive fiber or other low-cost high capacity connection to the Internet backbone. The interconnected nodes may include readily available components, such as wireless routers, microwave radios, and routers, and leverage close proximity to adjacent nodes for establishing a path back to the trunk line access point. Subscriber access is facilitated by a "one click" or "minimal click" sign on sequence by startup logic encoded in the components for identifying the nearest adjacent node, establishing communication with the adjacent node via an access token such as an SSID, and reestablishing a traffic connection following user assent to the sign-on conditions (i.e. user agreement) by switching communication via a new access token (such as an authenticated SSID) for providing traffic access while maintaining a user appearance of a continuous connection by rendering preloaded screens pertaining to the sign on and configuration process.

In certain contexts, a specialized access medium may be employed as an alternative or load sharing path to primary Internet access at a particular location. Such a specialized access medium enjoys certain advantages over a mainstream Internet access commonly available. The specialized access medium may not define a full service Internet package in terms of support, throughput, or uptime, but advantages as a co-primary, secondary fallback or alternative access medium are attractive for the cost saving and performance enhancing features it provides. The specialized access medium is therefore offered in selected markets where it can leverage aspects of the local environment. Alternatively, the specialized access medium may also be employed as a primary access for contexts that are less sensitive to periodic or minor service disruptions, such as personal usage.

The specialized access medium may be offered due to particular advantages over conventional Internet access. The alternate access may be less expensive, due to geographic proximity to high-speed trunk lines from major providers, or may be in an environment where propagation of network signals is facilitated, perhaps by subscriber density or landscape topography. For example, in an urban environment, certain buildings house a terminus of a trunk line for a major provider, thus facilitating Internet access within that building while other buildings with more limited access are clustered nearby and within line-of-sight so wireless signals propagate readily. Other alternative transport mediums may be envisioned.

One particular configuration of the specialized access medium includes a base, or central gateway disposed at an access point to a low-cost trunk, such as in particular buildings where major providers choose to establish urban access points. A series of nodes are established according to line-of sight proximity for communication via microwave or other medium capable of transmission through windows. Each of the nodes corresponds to a subscriber access point and a transit node for providing continuity to a proximate node. Establishment of an array of line of sight nodes allows provisioning of the subscriber access point in exchange for also acting as a line-of-sight transit node for other subscribers. In an urban environment, a quantum of nodes (subscribers) in proximity allows an array of paths between the nodes, typically by disposing a microwave antenna in a window having the line-of-sight access to an adjacent node. By establishing each node with off-the-shelf components for wireless access, TCP/IP routing, and microwave transmission (radios), upfront equipment costs are minimized and ongoing subscription costs mitigated by providing a line-of-sight transit node location for other subscribers.

As a secondary enhancement to primary Internet service, initial service establishment is as streamlined and effortless as possible in order to entice new subscribers to take advantage of the specialized access medium. Configurations herein are based, in part, on the observation that users are inclined to engage a new service offering if the initiation of such a service is relatively effortless. In contrast, users are reluctant to further burden an IT staff with configuration and operation of a parallel resource different from a primary service with which the organization is familiar.

Unfortunately, conventional approaches to business Internet service provisioning suffer from the shortcoming that such services are expensive to operate, and may be prone to service outages regardless of a service level agreement (SLA) offered by the provider. As business necessity, Internet service providers charge substantial ongoing (monthly) fees, and typically follow a business model that charges more for higher bandwidth (throughout) and/or more SLAs guaranteeing more robust service. Configurations herein substantially overcome the cost, configuration, and outage issues associated with conventional Internet service by providing a specialized access medium, using an alternate access network, with minimal service startup efforts and reduced cost by leveraging a network of close proximity line-of-sight transit nodes in an urban environment. In one preferred embodiment, potential subscribers purchase and install their own equipment and then turn management over to the ISP operating the alternate access network. Service startup, as disclosed further below, employs a "one click" approach to startup and initialization, given appropriate configurations. Alternatively, service startup employs minimal "clicks," or browser manipulations, in order to provide a new user with Internet access based on the alternate access medium.

In an example arrangement, the specialized access medium may be a local array of transit and service nodes coupled with microwave transmitters that rely on a line-of-sight wireless connection to adjacent nodes. The line-of-sight architecture leverages the close proximity of user sites available in an urban environment. Further, since microwave signals can propagate through glass, nodes may be established internally within a building or office without any external modification to the structure, thus avoiding aesthetic and/or lease related issues with installing the alternate access network.

In further detail, the method of enrolling subscribers for a network service includes scanning for an initialization token, and employs the initialization token to establish a first session. The initialization token, in the example arrangement, is an SSID (Service Set Identification) as is known for establishing wireless communication, often referred to as WiFi. In a particular arrangement, delivered equipment employs embedded startup logic for identifying the initialization SSID to begin the registration and configuration process. A single confirmation ("click") is required from a user to assent to the sign-on and registration for providing Internet connectivity via the specialized access medium. The equipment receives, via the first session, a discovery script for identifying at least one node associated with the initialization token and for transmitting the network identity of the identified node for enabling a remote login to establish a second session. The user device employs the initialization token and the discovery script to maintain an appearance of a continuous session while disconnecting the user from the established first session, remotely reconfiguring the user's newly installed node so it can become part of the specialized access medium and then reassigning the user to the second session based on an operational token such as a different SSID for operational usage.

Alternate configurations of the invention include a multi-programming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein present a centrally administered wireless network (the alternate access network) where wireless nodes are owned by individuals who contribute the node to the network in exchange for access to services. For example, by adding a node to the network, a subscriber receives free Internet access and the right to purchase other premium communications services at very low prices. In a particular arrangement, the minimum node includes two or more WiFi radios and a router. These may be integrated into one enclosure or may consist of separate products interconnected with off-the-shelf Cat5e cables. The disclosed approach allows individuals to buy such equipment, potentially from any source, and join our network with an absolute minimum of hassle. In the simplest case, the steps are: power up the wireless node, connect to it over Wi-Fi using a PC or other web browsing device, visit the alternate access website (or be taken there automatically), see a welcome screen that asks if you want to join the alternate access network and then click on a specific membership plan. Various scenarios are depicted below. In a particular arrangement, new subscriber equipment for providing a relay node (two or more WiFi radios and a router, possibly integrated in one package) is shipped with startup logic that expects and initiates configuration with the specialized access medium.

The disclosed arrangements strive to permit new user configuration with minimal action or effort (i.e. "clicks") on the part of the user, typically a "one click" approach, meaning that upon power up of the specialized access device, a single mouse click from a recognizing browser is all that is required of the user. In other cases, depicted below, there may be an extra step such as attaching an Ethernet cable and an extra click to allow local execution of a program downloaded from the alternate access website.

The difference between cases depends on whether the wireless equipment's default power-up configuration is able to automatically connect to the Internet and act as a repeater, i.e. an Internet-connected local WiFi access point, or whether the new node must be configured before it can participate in any network. In a particular arrangement, new connection equipment, such as a wireless router for connecting via the specialized access medium, includes startup logic for identifying an open SSID corresponding to the access medium. The following paragraphs describe particular configurations in the context of the alternate access network although our invention can be applied to the more general problem of simplifying the connection of new equipment to any network.

Figure 1:
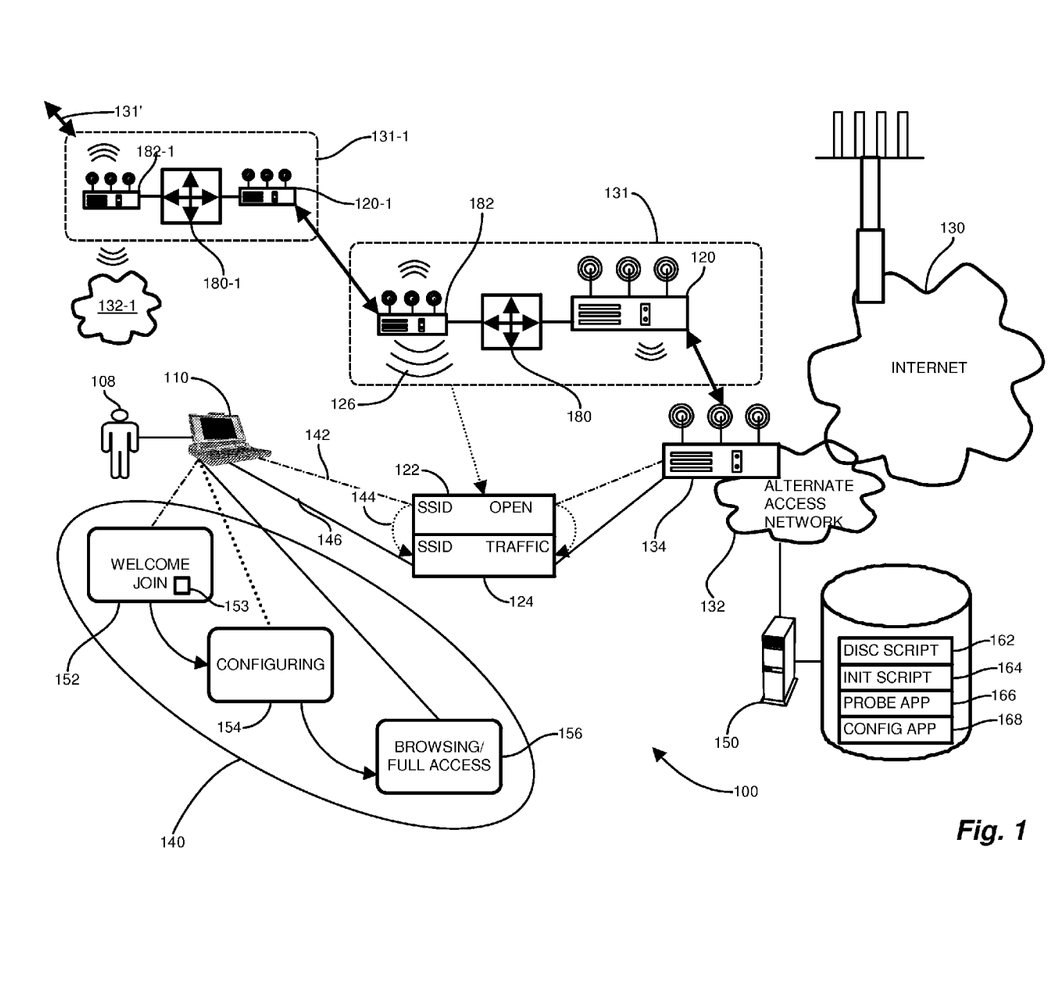
FIG. 1 is a context diagram of a wireless network environment suitable for use with configurations herein

FIG. 1 is a context diagram of a wireless network environment suitable for use with configurations herein. Referring to FIG. 1, a wireless network environment 100 includes a subscriber device 110 and an alternate access node 131 including at least a router 180, a receiving radio 120 and a repeater radio/access point 182. As part of the alternate access network architecture, the repeater radio 182 connects to a downstream or adjacent alternate access node 131-1 that also includes a router 180-1, receiving radio 120-1 and repeater radio 182-1 for communication with alternate access subnetwork 132-1, such as the next building or organization in the alternate access network. Repeater radio 182-1 in turn, may connect to other alternate access nodes 131. For purposes of example, the discussion herein will focus on alternate access node 131 and access point 182, however other access points 182-1 may be defined in the network 100. Each alternate access node 131 provides both a relay function and a service connection for the user. Typically a node incorporates multiple radios and a router, either as piece parts or in an integrated unit. This means a wireless node operating as a wireless access node 131-N incorporates both an access point (that the user can connect to) and a "station" which connects to an access point 182-N within the next relay node 131-N upstream. The alternate access node 132 may take the form of individual off-the-shelf components configured as described above, or as an integrated device having the described capabilities.

The access point 182 has at least two SSIDs 122, 124 for providing wireless access to the Internet 130. In configurations disclosed herein, an initial connection is established via the open SSID 122 and transitions to the traffic SSID 124 supported by an alternate access point 134. A local provider also supports an Internet gateway of the alternate access network 132 via the alternate access point 134, and provides wireless access using an alternate medium, such as the alternate access network accessible via nodes in adjacent or line-of-sight buildings, for example.

Upon initial connection and sign on, a user 108 identifies the open SSID 122 using a wireless interface of the subscriber device 110. The open SSID is intended to alert the subscriber to availability of a wireless signal, and exchange login information for enabling relay node configuration and then full access via the traffic SSID 124. A user 108 wishing to establish Internet service via the local provider 132 initially becomes connected to the open SSID 122, performs an identification and sign up procedure, followed by configuration to enable Internet access from the subscriber device 110 via relay node 131 and alternate access point 134. Configuration, which may occur according to one of several sequences, depending on the location and hardware type of the relay node 131. During configuration, the user device 110 exhibits a seamless transition while tearing down the connection with the open SSID 122 and reestablishing a connection via the traffic SSID 124, without receiving user selection of a reconnection, SSID, or other menu or button response in order to obtain connectivity via the traffic SSID 124. Further, the display screen sequence 140 on the user device 110 shows a continuous GUI application performing the configuration including the SSID changeover, without alluding to a temporary disconnect or loss of Internet service.

A user screen sequence 140 reflects the SSID transition. An initial connection 142 corresponds to an initial display 152. During configuration, the subscriber device 110 displays screen 154 while transitioning from SSID 122 to SSID 124, shown by dotted line 144. Upon establishment of a connection using SSID 124, a full access screen 156 is supported by the connection 146. In an example arrangement, the continuous appearance is employed by HTML5 and the associated Web Storage APIs (both the functions within the browser on the user's subscriber device 110) to maintain the appearance of a continuous session. The configuration application 168 remotely logs into the newly installed relay node 131 devices (120, 180 & 182) to obtain control and reprogram the device (s) so they become part of the alternate access network 132. Once the device(s) within the relay node 131 are reprogrammed by the configuration application 168, the subscriber device 110 is able to see that it is once again connected to the Internet and it can stop emulating the appearance of a continuous browser session.

Figure 2:
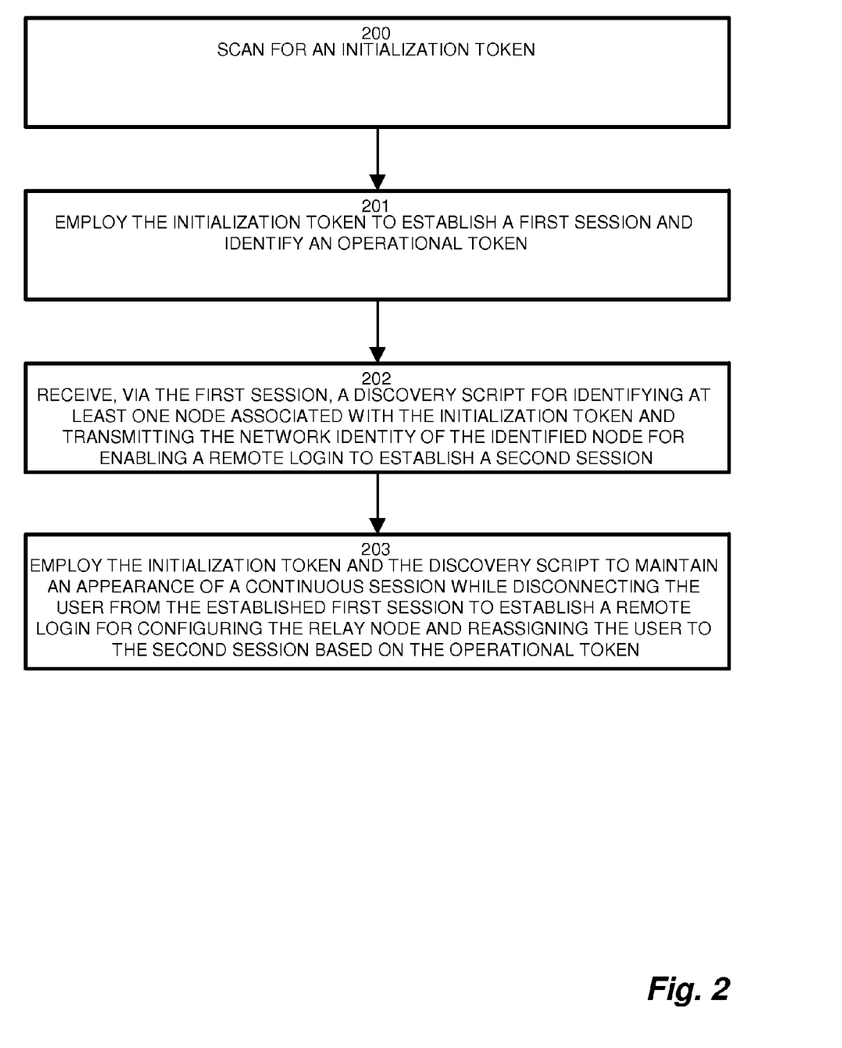
FIG. 2 is a flowchart of connectivity in the environment of FIG. 1.

FIG. 2 is a flowchart of connectivity in the environment of FIG. 1. Referring to FIGS. 1 and 2, the method of enrolling subscribers for a network service as defined herein includes scanning for an initialization token, as depicted at step 200, and employing the initialization token to establish a first session and identify an operational token, as shown at step 201. In the example arrangement, the initialization token is an open SSID available to any potential subscriber for establishing the welcome screen 152, and the operational token is the traffic SSID for secure wireless access. Alternatively, other tokens may be employed for providing initial general access for welcoming potential subscribers, and subsequently transitioning to a secure access mode once authentication, service selection and configuration are complete.

The user access equipment 182 receives, via the first session 142, a discovery script 162 for identifying the client device 110 and the components within relay node 131 associated with the initialization token 122 and for transmitting the network identity (i.e. IP addresses) of the identified devices in a discovery response 163 (see FIG. 3) for enabling a remote login to the devices within relay node 131, configuration of those devices and then the establishment by the client device 110 of a second session 146 through the newly configured relay node 131, as depicted at step 203. The user device 110 employs the initialization token 122 and the discovery script 162 to maintain an appearance of a continuous session 152, 154, 156 while the remote login by script 168 is reconfiguring the components of relay node 131 and then disconnecting the user from the established first session 142 and reassigning 144 the user to the second session 146 based on the operational token 124, as disclosed at step 203.

The relay node 131 represents an operational switching and access node within a switching fabric of the alternate access network (132 and connected nodes). Thus, a relay node refers to a combination of two or more radios and a router that alternate access network 132 members install, whether that combination is provided in one package, or as separate components connected by Cat5e cables. Within each relay node, radio 120 acts as a WiFi "station" connected to an upstream access point 134, while radio 182 acts a WiFi "access point" for other nodes downstream (like 131-1) and for the client device 110.

It should be noted that the terms access point and station are WiFi terms, exemplifying operation according to IEEE 802.11 standards. In alternate arrangements, using other radios (or using laser links), the receiving radio 120 may simply be referred to as an upstream device and the repeater/access point 182 operates as a downstream or relay device. In such a case, the relay node would have to include one WiFi access point or one Ethernet jack, so client device 110 may connect to the relay node. It should be noted that the relay node 131 (or more specifically the devices 120, 180, 182 within it) are configured for the alternate access network, while the client device 110 interacts with the user 108 and provides the appearance of a continuous session even when connection to either the alternate access network 132 or the Internet 130 is lost during the configuration process.

In each of the examples that follow, an initial connection 142 is made by various approaches, depending on the starting configuration of the components within the relay node 131, and the configuration process completes as above. In each case, the initialization script 164 identifies the open SSID 122 or determines if none is available. The initialization script 164 also presents the screen displays 152, 154, 156 that define the predetermined GUI observed by the user during the connection switchover from the open SSID 122 to the traffic SSID 124. The discovery script 162, which may accompany the initialization script 164 as a combined startup script 165, sends the identity (IP address) of the user device 110 and of the components within relay node 131. The response to the discovery script is the probe application 166 that examines the configuration of the user device 110 and any intervening nodes, contained in the probe response 163. The configuration application 168 then performs a login to the alternate access node 131 including the router 180, receiving radio 120 and repeater radio/access point 182 based on the previously gathered addresses to configure the alternate access network and enable the switchover to the traffic SSID 124 via the local provider network 132 (the alternate access network).

Figure 3:
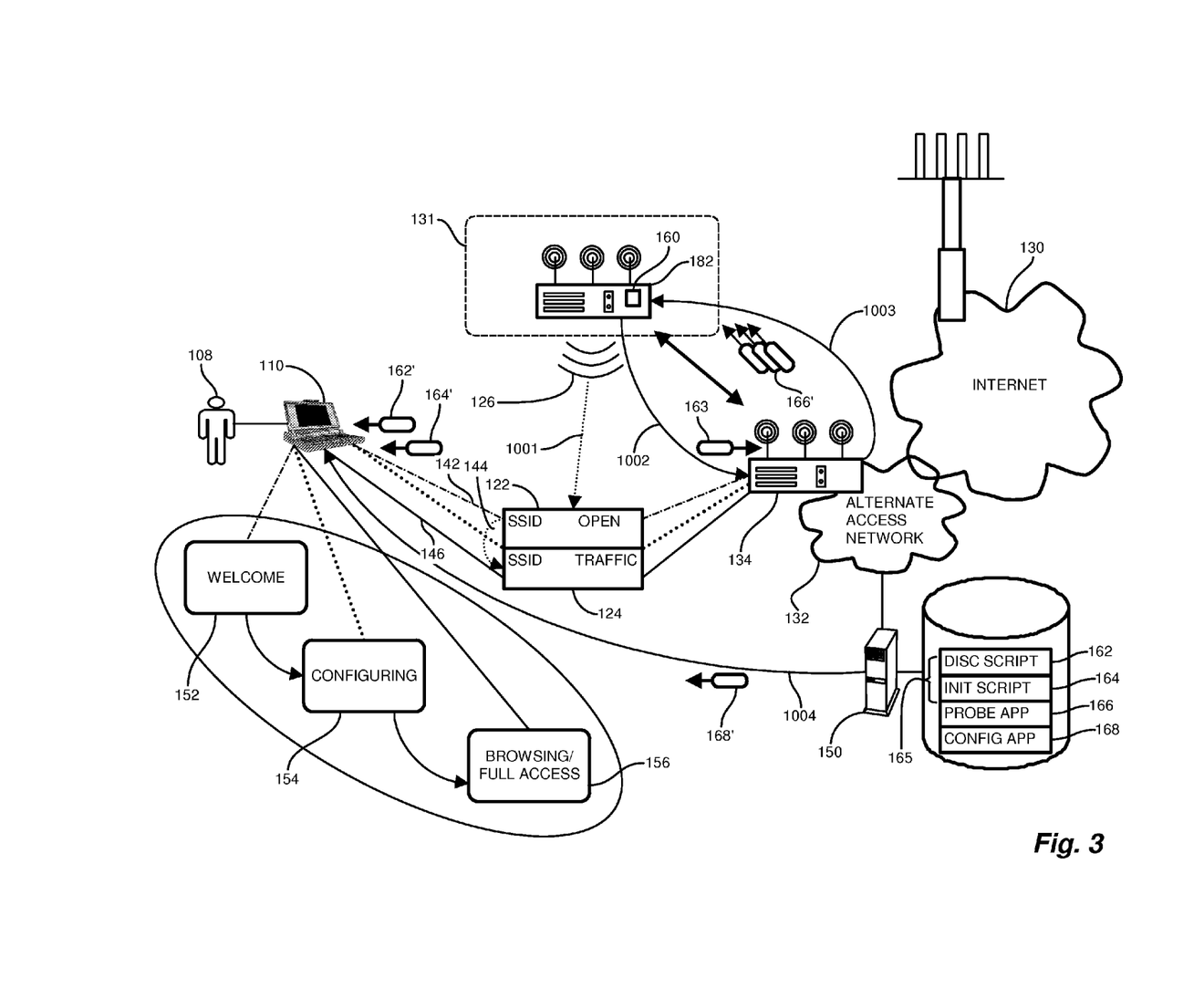
FIG. 3 is an example of configuration in the environment of FIG. 1.

FIG. 3 is an example of configuration in the environment of FIG. 1. Referring to FIGS. 1 and 3, for the case where the newly powered up equipment (radio) 182 has startup logic 160 and is able to act as a relay and it initially connects to the Internet 130 via the alternate access network, the radio 120 connects because it found the alternate access open (unencrypted) SSID 122. In addition to alternate access's secure wireless links, most nodes in the alternate access network advertise 1001 an open public SSID for attracting new subscribers. This open SSID 124 does not give access to the whole Internet but rather redirects users to one or more pages 152 that advertise alternate access services, support alternate access enrollment and allow connections to the alternate access installation server 150.

For relay node equipment 131 that has been certified as compatible with the alternate access network 132, the installation server 150 catalogs the equipment's 131 initial startup behavior via a startup, or initialization script 164, specifically including which URLs it seeks to connect to. When the user device 110 connects to the alternate access open SSID 122 and requests a URL or URLs in a pattern that matches one of the cataloged initial startup behaviors, the web request is redirected to the alternate access installation server 150, as shown by arrow 1002.

Part of installation server's 150 response is a discovery script 162 that causes the client device 110 to do a traceroute and report the results to the installation server 150. The sent discovery script 162' provides the installation server 150 with the IP addresses 163 of the newly connected equipment 131, i.e. the IP addresses of the client and of those devices between the client and the known alternate access network elements 134. A server-based application 166 in the installation server 150 can then probe 166' these IP addresses for testing factory default login sequences for each of the different devices supported by the alternate access network in order to identify the device. While this is happening, the discovery script 162' displays the welcome page 152 describing the alternate access network, describing what it means to join (i.e. terms and conditions) and offering one or more service plans.

If the alternate access network confirms that the new equipment 131 is alternate access compatible, the installation server 150 updates the displayed welcome page 152 to inquire if the user 108 wants to subscribe to the alternate access by clicking on one of the "join" buttons 153 now displayed next to each of the plans. Making this one click sends and invokes the initialization script 164 on the client 110 causes the client to display an hourglass and to poll the alternate access URL every second or so waiting for an installation completion message. It also invokes a configuration process 168 on the installation server 150 which remotely logs into 168' the device or devices that make up the new node 131, verifies they have the latest software, downloads new software if they do not, and then reconfigures them to be secure elements of the alternate access network 132. While this is happening the new relay node 131 will briefly lose connectivity but will eventually associate with a new secure alternate access SSID 124 and become part of the alternate access network 132. At that point, the browser on the subscriber device 110 is able to once again connect to installation server 150 which returns the installation complete page 156. It should be noted that from the user perspective, the local initialization script 164' keeps a local configuration page 154 alive (including a spinning hourglass or more detailed status updates) while the devices within relay node 131 are reconfigured and network connectivity via SSID 122 is temporarily lost for transitioning to the traffic SSID 124, as shown by arrow 144.

In further detail, once the configuration application 168 has gained remote access to the user's newly installed node 131, the application 168 updates the firmware to a latest release for the devices within node 131 as determined by the discovery response 163, and then configures the devices (120, 180 & 182) so the node becomes an alternate access node 131 in the alternate access network 132. Such reconfiguration is performed as part of confirming compatibility and maintaining the appearance of a continuous session for reprogramming and reconfiguring the user's newly installed equipment so it can include a repeater radio 182 to further extend the alternate access network 132-N. The configuration application 168 reestablishes a new connection 146 using the traffic SSID 124, such that upon completion of the configuration application 168, the new user device 110 is securely connected to the Internet as a node of the alternate access network 132.

Figure 4:
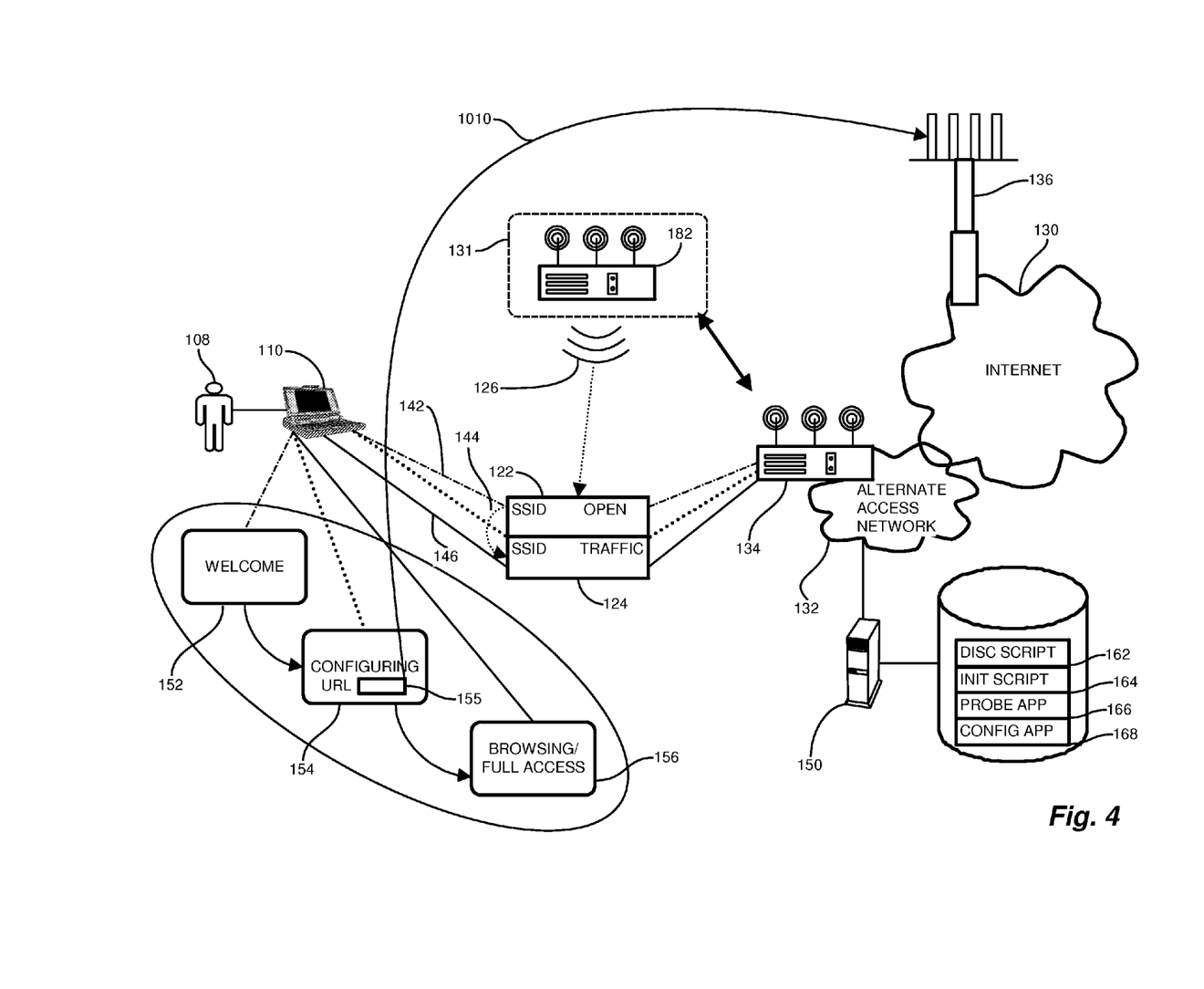
FIG. 4 is an example of configuration as in FIG. 3 using a website.

FIG. 4 is an example of configuration as in FIG. 3 but using any other available Internet connection to reach the alternate access network's ISP's website and installation server 150. Referring to FIGS. 3 and 4, in another arrangement, startup logic 160 for automatically identifying an available SSID 122 and local provider 143 is not included in the components that will form relay node 131. For the case where relay node 131, as shipped by its manufacturer, can relay web connections, but does not have the startup logic 160 and hence, connects to the Internet by some means other than the alternate access network, an extra step is required. The user wanting to join will have to explicitly type in the URL 155 for direct access to a website including a configuration screen, as shown by arrow 1010. Once there, the process is as in FIG. 3 with a distinction that, since the Internet connection is not over the alternate access network, the radio 182 can't identify with certainty whether the new node is just the second address in the traceroute or has several addresses. To compensate, the discovery script 162 performs a traceroute to probe the 2nd and subsequent addresses to automatically identify the new node equipment and the IP addresses (if there are several) associated with it. Hence, a configuration with generic or off-the-shelf equipment not shipped with the startup logic 160, requires the user to reach the configuration website, after which one-click configuration as above is all that is required.

Figure 5:
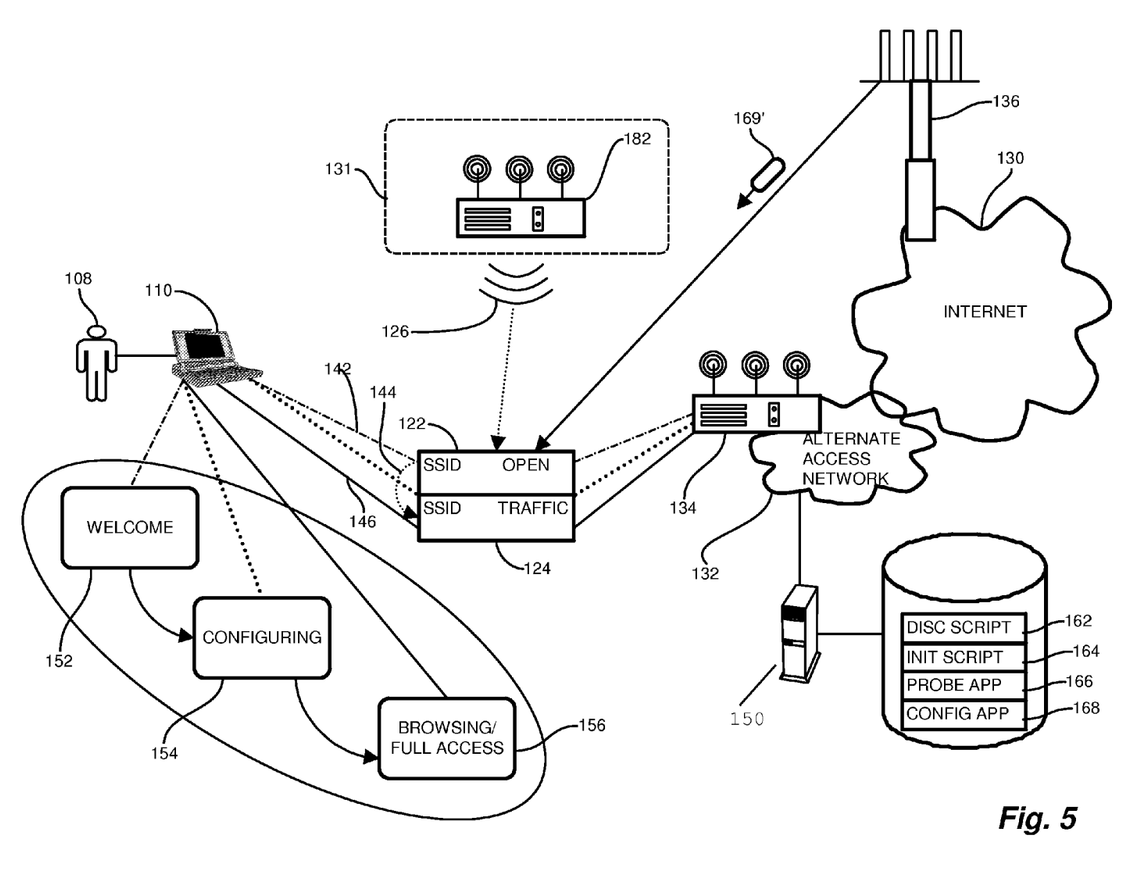
FIG. 5 is an example of configuration as in FIG. 3 using manual configuration.
Figure 6:
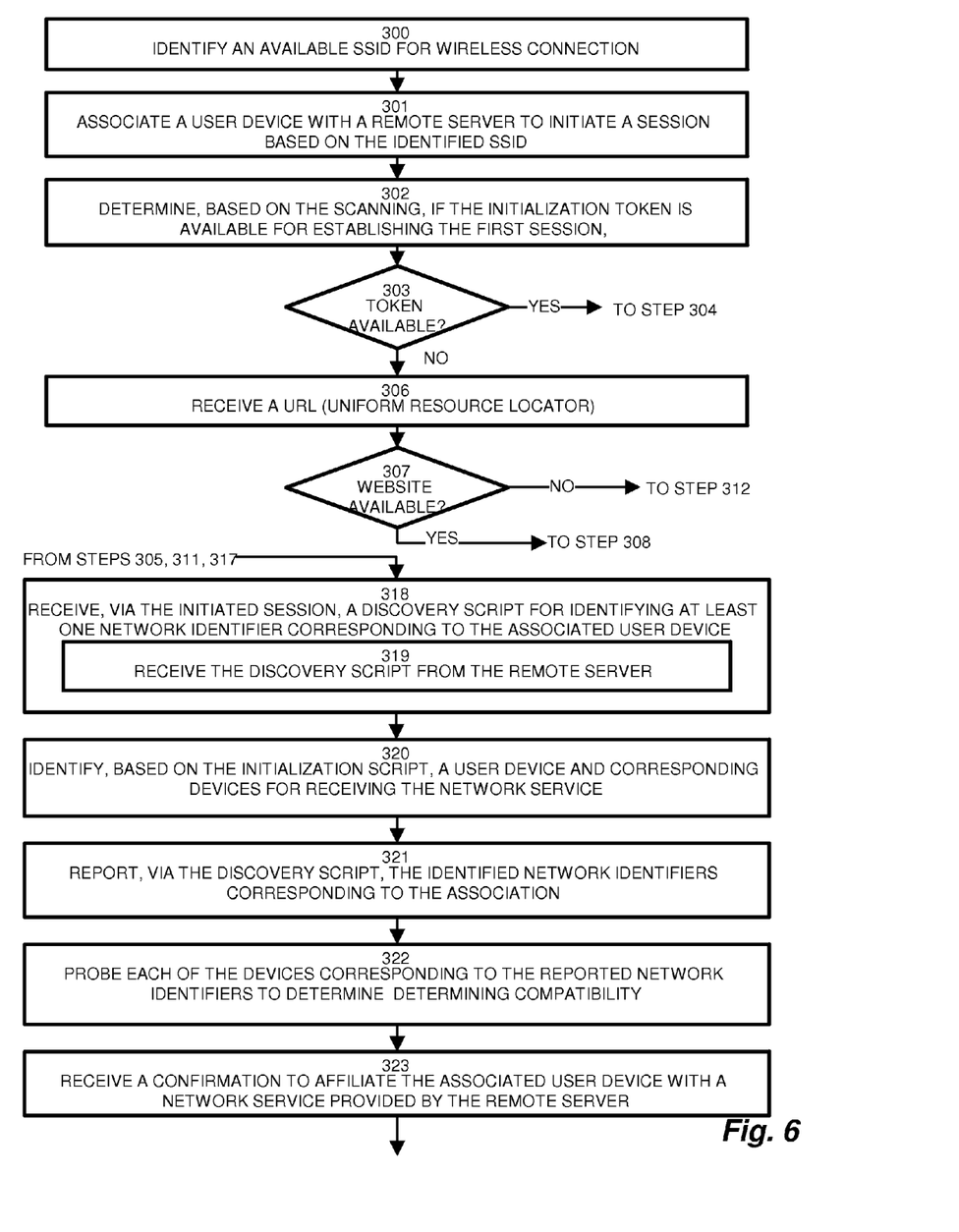
FIGS. 6-9 are a flowchart of configuration as in FIGS. 3-5.
Figure 7:
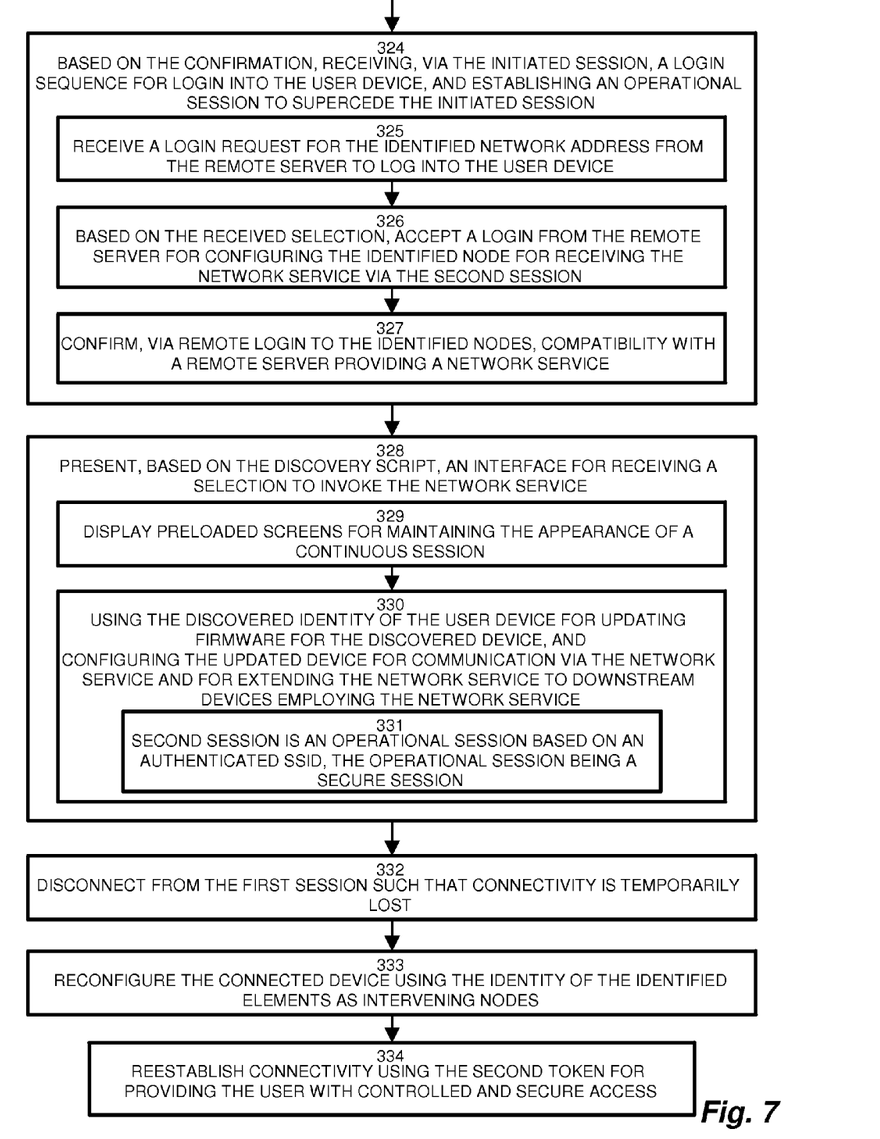
Figure 8:
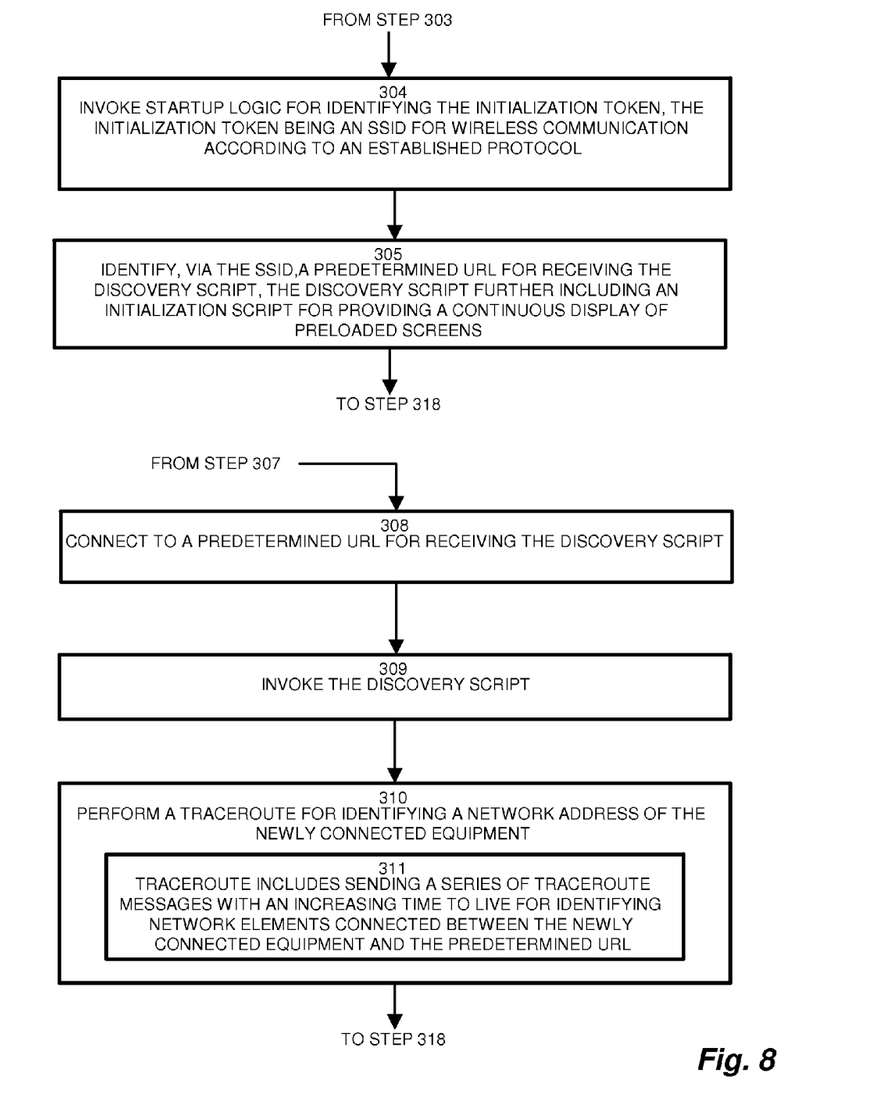
Figure 9:
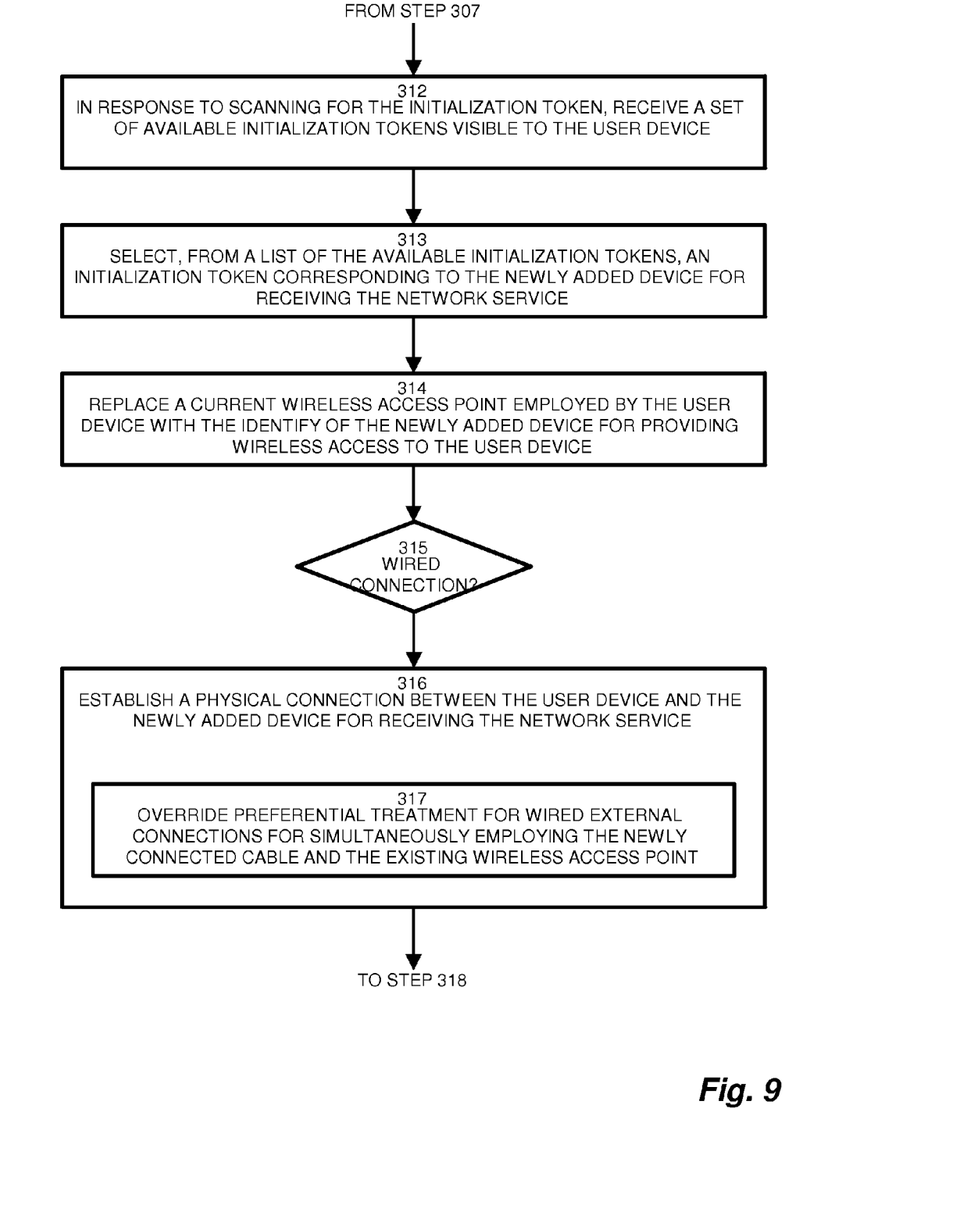

FIG. 5 is an example of configuration as in FIG. 3 using manual configuration for the initial connection to the website of the alternative access network. Referring to FIGS. 3 and 5, for the case where the relay node 131 equipment is not able to connect to any network without prior configuration, a proactive procedure allows the user to initiate the configuration and sign on by establishing an Internet connection through any available gateway 136. In this case, a potential network participant obtains an Internet connection, connects their user device 110 or other browsing device, goes to the alternate access installation webpage 152 and downloads a manual configuration application 169. However, even this exchange is automated by the welcome 152 and configuration screens 154 such that it appears to be just simple web browsing, rather than tearing down and establishing new connections.

An initial user exchange occurs via the user device 110 and the gateway 136, for receiving the manual configuration application 169. The manual configuration application 169, as described further below, modifies the user device 110 Internet access default to switch over to either a wireless or wired connection to the local access point 182. During the configuration of the device or devices (e.g. 120, 180 & 182) within relay node 131, the manual configuration application 169 allows the user to appear to remain connected to the installation server 150 even when they are not connected to the web. The manual configuration application 169 employs the user device 110 native Wifi API to programmatically change the Wi-Fi access point with which the user web browser device 110 associates. The initial connection 142 occurs by user initiation of accessing the website 150, and concludes with a wired or wireless connection to the relay node 131 for wireless communication with the alternate access device 134.

When the user connects to the alternate access device 134 and installation server 150 but the installation server 150 is unable to discover an alternate access compatible wireless node in the path between the client and the server, the server delivers a page offering a list of alternate access compatible devices and asking the user to click on the one they've installed.

Based on their selection, appropriate material (web pages, configuration images and the configuration applet) is downloaded into local storage on the user device 110. The configuration applet executes probe 166 on user device 110 and, if the probed devices appear compatible, then the user sees the welcome page 152 describing alternate access, describing what it means to join and offering one or more plans. As before, the user joins by clicking one of the "join" buttons displayed next to the plans.

If the newly installed node 131 is one to which the user 108 will eventually connect via Wi-Fi, the probing and configuration applets use the Native Wifi API to replace the current Wi-Fi association with a new one based on the installed node's default SSID. The newly installed node 131 is probed and confirmed to be useable. If there is a problem here or at any point in the configuration process, the manual configuration application 169 reconnects to the original Wi-Fi access point 136 and returns an error indication to the alternate access installation server so the alternate access server can lead the user through corrective measures.

Assuming the configuration succeeds, the equipment 131 will end up securely associated with the alternate access network 132, the browser 110 reconnects to the installation server 150 over the local provider 132 network and then displays the installation complete page 156.

If the newly installed node is one to which the user will eventually connect via a fixed Ethernet connection, then it is possible for the browsing device 110 to be simultaneously connected to the Internet (via Wi-Fi) and to the newly installed wireless node (via an Ethernet cable). In this case, the downloaded configuration application 169 is responsible for updating the local routing table on the browsing device 110 after the user is prompted to plug in the Ethernet cable. This is necessary on many devices as some operating systems (e.g. MICROSOFT WINDOWS®) automatically update the default route to the Internet 130 to give priority to physical Ethernet over Wi-Fi while we need to keep default Internet access going via Wi-Fi and only use the physical Ethernet for access to the new device (at least until configuration is complete).

FIGS. 6-9 are a flowchart of configuration as in FIGS. 3-5. Referring to FIGS. 1 and 3-9, at step 300, the method of enrolling subscribers for the alternate access network service includes, at step 300, identifying an available SSID 122 for wireless connection, and associating the user device 110 with a remote server 150 to initiate a session 142 based on the identified SSID 122, as shown at step 301. The initialization script 164 determines, based on the scanning, if the initialization token 122 is available for establishing the first session, and if not, receives the URL for the remote server 150 from a user interface 155, as disclosed at step 302. A check is performed, at step 303, to determine if the open SSID is available via preconfigured startup logic 160, and if so, control passes to step 304 for the registration sequence of FIG. 3. Otherwise, control passes to step 306 for considering the registration sequence of FIG. 4. At step 306, a check is performed to determine if a URL (Uniform Resource Locator) associated with the remote server for establishing the first session can be entered by the user. If the user entered URL can access the installation server 150 for establishing the initialization connection 142, control passes to step 308 for pursuing the installation sequence of FIG. 4, otherwise the installation sequence of FIG. 5 is pursued at step 318.

In the first case having alternate access enabled equipment 131, at step 304, the access device 182 invokes the startup logic 160 for identifying the initialization token 122, in which, in the example arrangement shown, the initialization token is an SSID for wireless communication according to an established protocol. Using the established connection 122, relay node 131 identifies, via the SSID, a predetermined URL for receiving the discovery script 162, such that the discovery script further includes the initialization script 164 for providing a continuous display of preloaded screens 152, 154, 156.

Continuing at step 318, the user device 110 receives, via the initiated session 122, the discovery script 162 for identifying at least one network identifier corresponding to the associated user device 110. The identifier is typically expected to be an IP address, but could be any suitable identifier such as a MAC address, for example. This includes receiving the discovery script 162 from the remote server 150 for maintaining an appearance of a continuous session (via screens 152, 154, 156) during termination of the initiated session 142 and reestablishing a connection via the operational session 144, as clarified at step 319.

Upon execution, the user device 110 gathers, based on the initialization script 164, network identifiers of the user device 110 and corresponding devices for receiving the network service 132, such that the corresponding devices including intervening devices between user device and remote server employed in providing the network services from the remote server 150, as depicted at step 320. The user device 110 reports, via the discovery script 162, the network identifiers corresponding to the association between the user device 110 and the remote server 150, as disclosed at step 321.

In response, the remote server 150 probes each of the devices 110 corresponding to the reported network identifiers to determine if the corresponding devices are compatible with the remote server 150 by executing the probe application 166 for sending probes 166', as shown at step 322. In response, the remote server 150 receives a confirmation 163 to the probes 166' to affiliate the associated user device 110 with the network service 132 provided by the remote server 150, as depicted at step 323.

Based on this confirmation 163, the user device 110 receives, via the initiated session 142, a login sequence for login into the user device 110, and for establishing an operational session 144 to supercede the initiated session 142, as depicted at step 324. This includes, at step 325, receiving a login request for the configuration application 168 based on the identified network address from the remote server 150 to log into the user device 110, as shown at step 326. The user device 110 accepts the login from the remote server 150 for configuring, using the configuration application 168, the identified node 110 for receiving the network service via the second session 144, as disclosed at step 326, and confirming, via remote login to the identified nodes (i.e. user device 110), compatibility with the remote server 150 providing the network service, as depicted at step 327.

The user display of the user device 110 presents, based on the discovery script 162, an interface 152 for receiving a selection 153 to invoke the network service 132, as shown at step 328. This includes displaying preloaded screens 152, 154, 156 for maintaining the appearance of a continuous session, as depicted at step 329, and reconfigures the relay node 131 for operation as part of the alternate access network 132. The configuration application 168, after logging in, updates the firmware to a latest release for the discovered devices that comprise relay node 131, as well as any other devices determined by the discovery response 163, and then configures the devices (e.g. 120, 180 & 182) so the node becomes an alternate access node 131 in the alternate access network 132. As the configuration application 168 reconfigures and establishes the operational session 146, the user device 110 continues executing, during the establishment of the operational session, the initialization script 164 for maintaining the appearance of the continuous session 152, 154, 156 on the user device 110 while the initiated session 142 is disconnected and the operational SSID 124 is invoked for association to the remote server 150, as clarified at step 330. In the example configuration shown, the second session 144 is an operational session based on an authenticated SSID 124, such that the operational session is a secure session, as shown at step 331.

From the executing configuration application 168, the user device 110 disconnects from the first session 142 such that connectivity is temporarily lost, as depicted at step 332, and the configuration application 168 reconfigures the connective device 182 using the identity of the identified elements as intervening nodes, as disclosed at step 333. The user device then reestablishing connectivity using the second token 124 for providing the user with controlled access to the alternate access network 132, as depicted at step 334.

If the check at step 303 indicates that the new equipment does not have the startup logic 160, then performing initial startup behavior includes connecting to a predetermined URL 155 for receiving the discovery script, as depicted at step 308 and shown in the configuration example of FIG. 4. The user device 110 invokes the discovery script 162, as depicted at step 309, and performs a traceroute, or probe 166', for identifying a network address of the newly connected equipment 110, as disclosed at step 310. The traceroute includes sending a series of traceroute messages with an increasing time to live for identifying network elements connected between the newly connected equipment and the predetermined URL, as clarified at step 311, and control returns to step 318 for configuration as above.

If the check at step 307 indicates that the initialization token 122 is still unavailable, the sign-on sequence includes, in response to scanning for the initialization token, receiving a set of available initialization tokens visible to the user device, as shown at step 312. These are generally available WiFi signals propagated by devices within range. The user 108 selects, from a list of the available initialization tokens, an initialization token corresponding to the newly added device for receiving the network service, as depicted at step 313. Typically, it can be expected that the user would be able to identify a signal emanating from the newly connected access device 182 from observing either the name or signal strength and by knowing preexisting signals in proximity. In this scenario, the configuration application 168 replaces a current wireless access point employed by the user device with the identity of the newly added device 182 for providing wireless access to the user device 110, as depicted at step 314. Depending on whether the user device 110 will employ wired or wireless access for the operational connection 144, as depicted at step 315, the user further establishing a physical connection between the user device 110 and the newly added device 182 for receiving the network service, as depicted at step 316. Since some operating systems route Internet packets over wired interfaces by default, an extra step overrides this preferential treatment for wired external connections allowing simultaneous access to the node 131 devices via the newly connected cable and Internet access via the existing wireless access point, as depicted at step 317. Control then passes to step 318 to continue configuration as above.

Those skilled in the art should readily appreciate that the programs and methods for seamless access to an alternate access medium as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of seamless access to an alternate access medium has been particularly shown and described with references to embodiments thereof, it will be understood by those skilled in the art that various changes in form and details may be made therein without departing from the scope of the invention encompassed by the appended claims.

What is claimed is:

1. A method of enrolling subscribers for a network service comprising:
   identifying an available SSID for a wireless connection;
   associating a user device with a remote server to initiate a session based on the identified SSID;
   receiving, via the initiated session, a discovery script for identifying at least one network identifier corresponding to the associated user device and at least one intervening node operable as a relay node for downstream access points;
   reporting, via the discovery script, the identified network identifiers corresponding to the association between the user device, the intervening node and the remote server;
   probing each of the nodes corresponding to the reported network identifiers to determine compatibility with the remote server;
   receiving a confirmation to affiliate the associated user device with a network service provided by the remote server;
   based on the confirmation, receiving, via the initiated session, a login sequence for a login into the user device, and establishing an operational session to supersede the initiated session; and
   executing, during the establishment of the operational session, a remote login from the remote server for reconfiguring the user device and the intervening node, via accepting the remote login, to provide the network service to the user device and for configuring the identified intervening node for operation as a relay node for relaying the service to downstream network nodes while maintaining the appearance of a continuous session on a user browsing device while the initiated session is disconnected and an operational SSID is invoked for association to the remote server.

2. The method of claim 1 further comprising receiving the discovery script from the remote server for maintaining an appearance of a continuous session during termination of the initiated session and reestablishing a connection via the operational session.

3. A non-transitory computer readable storage medium having a series of encoded instructions that, when executed by a processor, perform a method of enrolling subscribers for a network service comprising:
   scanning for an initialization token;
   employing the initialization token to establish a first session and identify an operational token;
   receiving, via the first session, a discovery script for identifying at least one node defining newly connected equipment and associated with the initialization token and transmitting the network identity of the identified node for enabling a remote login to establish a second session;
   confirming, via the remote login to the identified node, compatibility with a remote server providing a network service;
   presenting, based on the discovery script, an interface for receiving a selection to invoke the network service;
   based on the received selection, accepting a login from the remote server for configuring the identified node for operation as a relay node for downstream nodes in the network service and for receiving the network service via the second session; and
   employing the initialization token and the discovery script to maintain an appearance of a continuous session while disconnecting the subscriber from the established first session and accepting the remote login for reassigning the subscriber to the second session based on the operational token.

4. The method of claim 3 wherein scanning further comprises:
   invoking startup logic for identifying the initialization token, the initialization token being an SSID for wireless communication according to an established protocol; and
   identifying, via the SSID, a predetermined URL (Uniform Resource Locator) for receiving the discovery script, the discovery script further including an initialization script for providing a continuous display of preloaded screens.

5. The method of claim 4 wherein the second session is an operational session based on an authenticated SSID, the operational session being a secure session.

6. The method of claim 5 further comprising identifying, based on the initialization script, a user device and corresponding nodes for receiving the network service, the corresponding nodes including intervening devices between the user device and the remote server employed in providing the network services from the remote server.

7. The method of claim 3 further comprising performing initial startup behavior including:
   connecting to a predetermined URL for receiving the discovery script;
   invoking the discovery script; and
   performing a traceroute for identifying a network address of the newly connected equipment.

8. The method of claim 7 wherein the traceroute includes sending a series of traceroute messages with an increasing time to live for identifying network elements connected between the newly connected equipment and the predetermined URL.

9. The method of claim 3 further comprising:
   receiving a login request for the identified network address from the remote server to log into the user device;
   displaying preloaded screens for maintaining the appearance of a continuous session;
   disconnecting from the first session such that connectivity is temporarily lost;
   reconfiguring the connected node using the identity of the identified at least one node as intervening nodes; and
   reestablishing connectivity using the second token for providing the user with controlled access.

10. The method of claim 3 wherein reconfiguration of the user device further comprises:
    using the discovered identity of the user device for updating firmware for the discovered node, further including updating other nodes identified by the discovery script; and
    configuring the updated node for communication via the network service and for extending the network service to downstream nodes employing the network service.

11. The method of claim 3 further comprising receiving a URL (Uniform Resource Locator) associated with the remote server for establishing the first session.

12. The method of claim 10 further comprising determining, based on the scanning, if the initialization token is available for establishing the first session, and if not, receiving a URL (Uniform Resource Locator) for the remote server from a user interface.

13. The method of claim 3 further comprising, in response to scanning for the initialization token, receiving a set of available initialization tokens visible to the user device;
selecting, from a list of the available initialization tokens, an initialization token corresponding to the newly connected equipment for receiving the network service; and
replacing a current wireless access point employed by the user device with the identity of the newly connected equipment for providing wireless access to the user device.

14. The method of claim 12 further comprising establishing a physical connection between the user device and the newly added node for receiving the network service; and overriding preferential treatment for wired external connections for simultaneously employing the newly connected cable and the existing wireless access point.

15. An access device for enrolling subscribers for a network service comprising:
an antenna for scanning for an initialization token;
a radio having startup logic for employing the initialization token to establish a first session and identify an operational token; and
a network interface coupled to the radio for receiving, via the first session, a discovery script for identifying at least one node associated with the initialization token and transmitting a network identity of the identified node for enabling a remote login to establish a second session, the startup logic further configured to:
confirm, via the remote login to the identified nodes, compatibility with a remote server providing a network service;
present, based on the discovery script, an interface for receiving a selection to invoke the network service;
based on the received selection, accept a login from the remote server for configuring the identified node for operation as a relay node for downstream nodes in the network service and for receiving the network service via the second session; and
employ the initialization token and the discovery script to maintain an appearance of a continuous session while disconnecting the subscriber from the established first session and reassigning the subscriber to the second session based on the operational token.

16. The access device of claim 15 further comprising a connection to a user device, the user device responsive to the discovery script to:
confirm, via the remote login to the identified nodes, compatibility with a remote server providing a network service;
present, based on the discovery script, an interface for receiving a selection to invoke the network service; and
based on the received selection, accept a login from the remote server for configuring the identified node for receiving the network service via the second session.

17. The access device of claim 16 wherein the startup logic is further configured to
identify the initialization token, the initialization token being an SSID for wireless communication according to an established protocol; and
identify, via the SSID, a predetermined URL for receiving the discovery script, the discovery script further including an initialization script for providing a continuous display of preloaded screens.

18. The access device of claim 15 wherein the user device is responsive to the discovery script to identify, based on the initialization script, the user device and corresponding nodes for receiving the network service, the corresponding nodes including intervening nodes between the user device and the remote server employed in providing the network services from the remote server.

19. The access device of claim 18 wherein the user device is further configured to invoke the access device to performing initial startup behavior including:
connecting to a predetermined URL for receiving the discovery script;
invoking the discovery script; and
performing a traceroute for identifying a network address of the newly connected equipment, the traceroute including sending a series of traceroute messages with an increasing time to live for identifying network elements connected between the newly connected equipment and the predetermined URL.

20. The access device of claim 15 wherein the user device is further configured to
receive a login request for the identified network address from the remote server to log into the user device;
display preloaded screens for maintaining the appearance of a continuous session;
disconnect from the first session such that connectivity is temporarily lost;
reconfigure the connected node using the identity of the identified elements as intervening nodes; and
reestablish connectivity using the second token for providing the user with controlled access.

21. The method of claim 3 wherein the login is received from the server into the remote user/relay node for establishing the new node as an operational switching and access node responsive to downstream traffic, in addition to operating as an access point.

22. The method of claim 3 further comprising:
probing discovered intervening nodes for determining a network identifier of the probed intervening node; and
based on the determined network identifier, testing a factory default login sequence for identifying the intervening node.

23. The method of claim 3 further comprising sending, upon a successful login to the intervening node based on a preconfigured default login setting, the discovery script from the remote server for configuring the intervening node, the discovery script sent based upon a single button activation on the continuous session rendered to the user.

* * * * *